United States Patent [19]

Umezawa

[11] Patent Number: 5,541,786

[45] Date of Patent: Jul. 30, 1996

[54] LOADING APPARATUS FOR TAPE CASSETTE INCLUDING SAFETY MECHANISM FOR PROTECTING CASSETTE HOUSING AND HANGER STRUCTURE FROM DAMAGE BY EXTERNALLY APPLIED FORCE

[75] Inventor: Koji Umezawa, Kanagawa, Japan

[73] Assignee: Sony Corporation, Japan

[21] Appl. No.: 321,527

[22] Filed: Oct. 12, 1994

[30] Foreign Application Priority Data

Oct. 28, 1993 [JP] Japan .................... 5-270888

[51] Int. Cl.$^6$ .................................... G11B 15/66
[52] U.S. Cl. .................................... 360/96.5
[58] Field of Search .................... 360/96.5, 93, 105, 360/90

[56] References Cited

U.S. PATENT DOCUMENTS

| | | | |
|---|---|---|---|
| 4,507,694 | 3/1985 | Hosono et al. | 360/90 |
| 4,612,591 | 9/1986 | Tanaka et al. | 360/96.5 |
| 4,638,386 | 1/1987 | Takamatsu | 360/96.5 |
| 4,723,236 | 2/1988 | Kitami | 360/93 |
| 5,105,320 | 4/1992 | Hayashi | 360/105 |
| 5,377,061 | 12/1994 | Yoshimura | 360/96.5 |
| 5,386,330 | 1/1995 | Kage et al. | 360/96.5 |

Primary Examiner—Robert S. Tupper
Assistant Examiner—Brian E. Miller
Attorney, Agent, or Firm—Ronald P. Kananen

[57] ABSTRACT

A cassette loading mechanism for a tape cassette player can be simplified in arrangement and carry out automatic loading operation reliably. A cassette housing (2) into which a tape cassette is inserted and held, is supported on a mechanical chassis (1) by a housing hanger (3) so that the cassette housing (2) can be elevated and lowered freely. The housing hanger (3) is rotated in the upper direction by a loading lever arrangement composed of first and second loading levers (10), (11) and a loading arm (14) to thereby elevate and lower the cassette housing (2). A catcher member (5) is slid in the front and rear direction relative to the cassette housing (2) by rotating a pull-in lever (8) having the catcher member (5) engaged with hub apertures of the tape cassette.

4 Claims, 9 Drawing Sheets

LOADING APPARATUS FOR TAPE CASSETTE INCLUDING SAFETY MECHANISM FOR PROTECTING CASSETTE HOUSING AND HANGER STRUCTURE FROM DAMAGE BY EXTERNALLY APPLIED FORCE

BACKGROUND OF THE INVENTION

The present invention relates to tape cassette players and, particularly to a tape cassette automatic loading apparatus capable of automatically loading a tape cassette on a tape cassette player.

Cassette players, particularly, car tape cassette players that have hitherto been proposed include an automatic loading apparatus in which a tape cassette is automatically pulled into and loaded on a tape cassette player when the tape cassette is inserted into a cassette mouth.

U.S. Pat. No. 4,638,386 describes an automatic loading apparatus for automatically loading a tape cassette by operating a loading cam gear either by a trigger, such as a plunger or the like or by a movement of a swinging gear under a driving force of a main motor that rotates hub drive shafts, capstans or the like.

The above-mentioned automatic loading apparatus for the tape cassette player becomes complicated from a mechanism standpoint. Also, in this previously-proposed automatic loading apparatus, the tape cassette tends to be pulled in, ejected, elevated or lowered with a delay of timing. There is then the defect that the automatic loading apparatus becomes unable to load and/or eject the tape cassette.

U.S. Pat. No. 4,723,236 describes an automatic loading apparatus which includes a control motor exclusively-designed for an automatic loading apparatus. In this example of automatic loading apparatus, a cassette housing for loading and accommodating a tape cassette is engaged with and/or disengaged from the hub drive shafts, the capstans or the like, by directly elevating and/or lowering the tape cassette through a guide cam groove formed in an intermediate disc. Therefore, when an external force is applied to the cassette housing in which the tape cassette is loaded and accommodated, the external force is directly applied to an engagement portion composed of a sliding plate and a guide cam opening. The engagement portion is rigid and the cassette housing and the sliding plate are deformed unavoidably. There is then the risk that the automatic loading apparatus becomes unable to load the tape cassette.

SUMMARY OF THE INVENTION

In view of the aforesaid aspects, it is an object of the present invention to provide a simplified loading apparatus for a tape cassette.

It is another object of the present invention to provide a tape cassette player in which a cassette housing can be prevented from undergoing deformation even when an external force is applied to the cassette housing and in which a tape cassette can be loaded reliably and smoothly.

According to one aspect of the present invention, there is provided a loading mechanism for a tape cassette player which comprises a cassette housing supported to a mechanical chassis and which can be elevated and lowered before a cassette loading position, a cassette eject position and a cassette playing position, a housing hanger supported to the mechanical chassis to cause the cassette housing to be elevated and lowered, a loading lever arrangement which is driven by a control motor and loading arm for converting a driving operation of the loading lever arrangement to a rotation operation of the housing hanger, wherein the loading arm includes a first support shaft movably engaged with a vertically-elongated opening formed on the mechanical chassis and a second support shaft engaged with an operating cam opening defined on the loading lever arrangement, the first support shaft being biased by a spring so as to be engaged with an upper end of the elongated opening defined on the mechanical chassis, and the first support shaft being rotated about the second support shaft against the spring force when a downward external force is applied to the cassette housing irrespective of whether the housing is in the cassette loading position or in the cassette eject position.

DETAILED DESCRIPTION OF THE PREFERRED EMBODIMENT

Referring now to the drawings in detail, and initially to FIGS. 1 through 4, a cassette loading apparatus for a tape cassette according to an embodiment of the present invention will be described below.

As illustrated, a cassette loading apparatus includes a mechanical chassis 1 on which a cassette housing 2 for accommodating a tape cassette C is supported through a housing hanger 3 so as to be raised and/or lowered.

Figure 1:
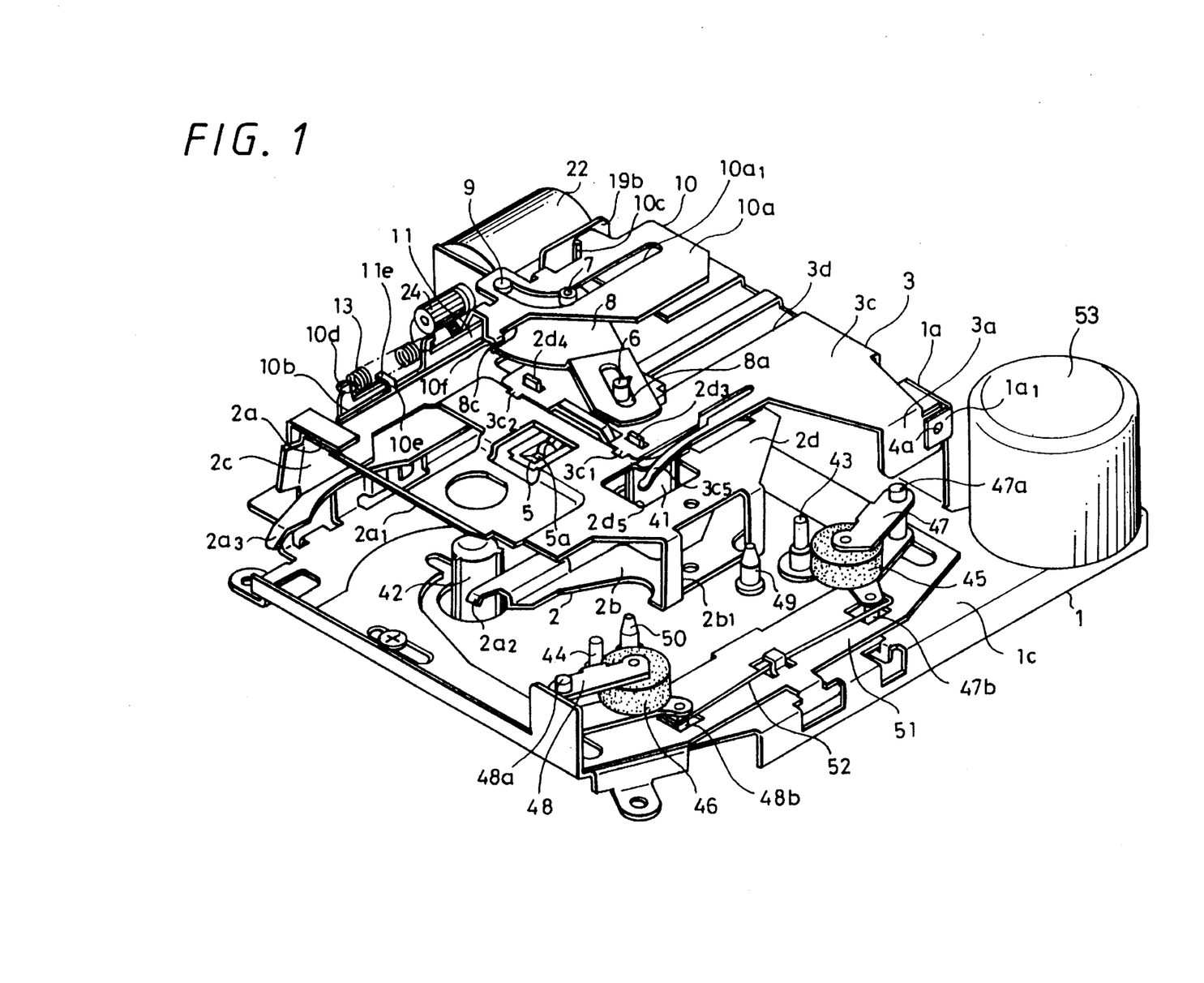
FIG. 1 is a perspective view showing a cassette loading apparatus for a tape cassette player according to an embodiment of the present invention.

The cassette housing 2 accommodates the tape cassette C which is inserted sideways thereinto. The cassette housing 2 has a cassette insertion opening 2a facing the side surface of the tape cassette C, formed on its front surface. The cassette housing 2 has substantially U-shaped holding portions 2b, 2c formed on its respective side surfaces. The insertion opening 2a has guide surfaces 2a1, 2a2, 2a3 formed on its upper and lower edge portions. Each of the guide surfaces 2a1, 2a2, 2a3 is inclined in the forward direction. A window opening 2b1 is formed through the side surface of the holding portion 2b of one side surface side, i.e., right side surface side of the cassette housing 2 as shown in FIG. 1.

Figure 2:
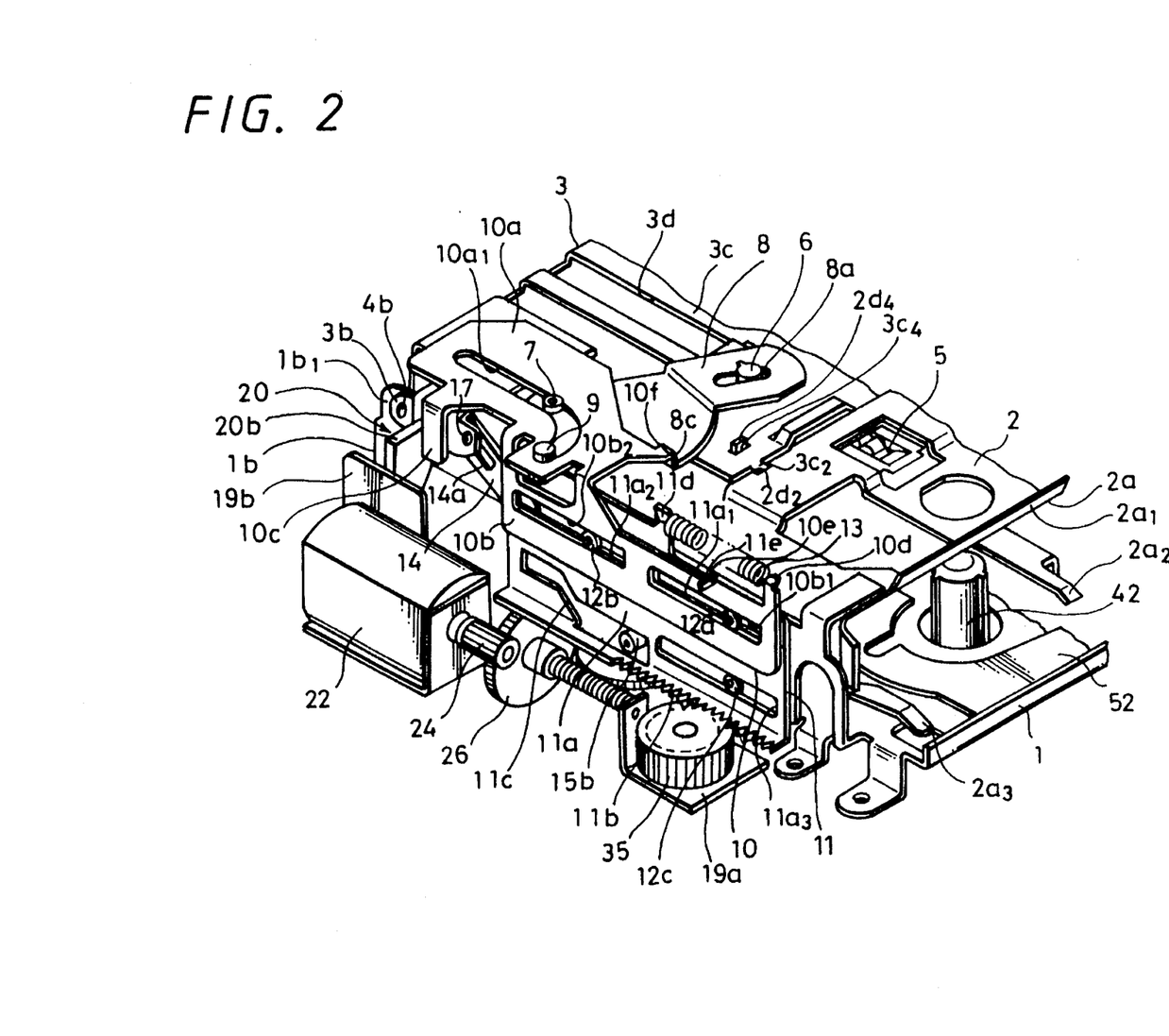
FIG. 2 is a fragmentary perspective view showing the same cassette loading apparatus from another direction.

The housing hanger 3 has supporting portions 3a, 3b formed on its rear respective side walls. The mechanical chassis 1 includes a rear surface portion 1a formed on its rear portion and a side surface portion 1b formed on its side portion. A supporting member 1a1 is forwardly projected from one side end edge of the rear surface portion 1a. The side surface portion 1b has a rear end portion 1b1. The housing hanger 3 is swingably supported on the supporting member 1a1 and the rear end portion 1b1 by shaft pins 4a, 4b. The housing hanger 3 has a flat surface portion 3c and engagement projection members 3c1, 3c2 which are projected from the front end edge of the flat surface portion 3c. The cassette housing 2 has an upper surface portion 2d and insertion openings 2d1, 2d2 formed on the rear portion of the upper surface portion 2d. The engagement projection members 3c1, 3c2 are engaged with the insertion openings 2d1, 2d2 from the rearward. The cassette housing 2 has an upper surface portion 2d and erected engagement projection members 2d3, 2d4 which are formed on the rear end edge of the upper surface portion 2d. Engagement openings 3c3, 3c4 are defined on the front end edge of the flat surface portion 3c of the housing hanger 3 in the rearward direction of the engagement projection members 3c1, 3c2. The erected engagement projection members 2d3, 2d4 are engaged with the engagement openings 3c3, 3c4 from the lower direction. Owing to the above-mentioned engagements between the engagement projections 3c1, 3c2 and the insertion openings 2d1, 2d2; and the engagement projections 2d3, 2d4 and the engagement openings 3c3, 3c4, the cassette housing 2 and the housing hanger 3 are joined so that they become swingable in the vertical direction.

The housing hanger 3 has a supporting member 3c5 formed on the flat surface portion 3c. The supporting member 3c5 is opposed to the inside of the cassette housing 2 through a window opening 2d5 formed on the upper surface portion 2d of the cassette housing 2. The housing hanger 3 has a guide rectangular opening 3d defined on its central portion in the front and rear direction. A so-called catcher member 5 has an engagement projection 5a formed on its lower surface front end portion. The engagement projection 5a is arranged to resiliently engage with a hub aperture h of the tape cassette C. The catcher member 5 is engaged with the guide rectangular opening 3d so as to become freely slidable in the front and back direction. The catcher member 5 has an engagement pin 6 projected from its upper surface.

The mechanical chassis 1 includes a supporting member portion 1b2 horizontally bent from the upper rear edge portion of its side surface portion 1b. A pull-in lever 8 is pivotally supported by a shaft pin 7 to the supporting member portion 1b2. The pull-in lever 8 has a rectangular opening 8a defined on one end thereof. The engagement pin 6 of the catcher member 5 is engaged with the rectangular opening 8a. The pull-in lever 8 has an engagement pin 9 implanted on the other end thereof.

As illustrated in FIG. 2, a first loading lever 10 comprises a horizontal surface portion 10a and a vertical surface portion 10b. The horizontal surface portion 10a has a cam opening 10a1 composed of a straight line portion extended in the front and rear direction and a curved portion outwardly curved from the front end of the straight line portion. The vertical surface portion 10b has a pair of aligned guide openings 10b1, 10b2 defined with a predetermined spacing in the front and rear direction. The horizontal surface portion 10a has an engagement member 10c extended from its outer side edge in the lower direction. The vertical surface portion 10b has a spring connection 10d projected from its front upper end. Further, the vertical surface portion 10b has an upwardly stepped engagement stepped portion 10e.

A second loading lever 11 is of a vertical flat plate whose length is substantially the same as that of the vertical plane portion 10b of the first loading lever 10 and whose width is substantially twice the vertical plane portion 10b of the first loading lever 10. The second loading lever 11 includes a main plate portion 11a and a rack 11b integrally formed with the lower edge of the main plate portion 11a at a right angle viz., so as to extend in the (horizontal direction) to the plate surface. The main plate portion 11a has guide openings 11a1, 11a2 defined on its upper half portion in the front and rear direction. The guide openings 11a1, 11a2 are opposed to the guide openings 10b1, 10b2 of the vertical plane portion 10b of the first loading lever 10. The main plate portion 11a has a horizontal guide opening 11a3 defined in its first half portion of the lower half portion and a loading operation cam opening 11c defined in its second half portion. The loading operation cam opening 11c is composed of a horizontal first half portion and a second half portion which is upwardly stepped with a predetermined inclination. Further, the main plate portion 11a has a spring connection member 11d vertically projected from substantially its center upper edge and an engagement projection member 11e projected in the horizontal direction.

The first and second loading levers 10, 11 are attached to the mechanical chassis 1 such that they can slide freely in the front and back direction.

Specifically, the second loading lever 11 is opposed to and attached to the side surface portion 1b of the mechanical chassis 1 by engaging the guide openings 11a1, 11a2, 11a3 with engagement pins 12a, 12b, 12c implanted on the side wall portion 1b of the mechanical chassis 1. The first loading lever 10 is attached to the mechanical chassis 1 as follows. Initially, the horizontal surface portion 10a of the first loading lever 10 is opposed to the upper side of the pull-in lever 8 on the upper surface side of the mechanical chassis 1. Under this condition, the cam opening 10a1 is engaged with the upper portion of the shaft pin 7, and the vertical surface portion of the first loading lever 10 is opposed to the main plate portion 11a of the second loading lever 11 on the side surface portion 1b of the mechanical chassis 1. Then, the guide openings 10b1, 10b2 are engaged with the outer end portions of the engagement pins 12a, 12b projected from the guide openings 11a1, 11a2 of the main plate portion 11a. Thus, the first loading lever 10 is attached to the mechanical chassis 1.

As described above, the spring clamping member 10d is formed on the upper front end edge of the vertical surface portion 10b of the first loading lever 10, and the spring clamping member 11d is formed on the central upper edge of the main plate portion 11a of the second loading lever 11. A tension coil spring 13 is extended between the spring connection members 10d and 11d so that the first and second loading levers 10, 11 are pulled toward each other under spring force of the tension coil spring 13. Thus, a limiter mechanism is constructed. By the engagement between the engagement stepped portion 10e and the engagement protrusion member 11e, the first loading lever 10 is slid concurrently when the second loading lever 11 is slid in the forward direction.

The engagement pin 9 of the pull-in lever 8 is engaged with the cam opening 10a1 of the horizontal surface portion 10a of the first loading lever 10 attached to the mechanical chassis 1 in front of the shaft pin 7, thus operatively interconnecting the pull-in lever 8 and the first loading lever 10.

Figure 3:
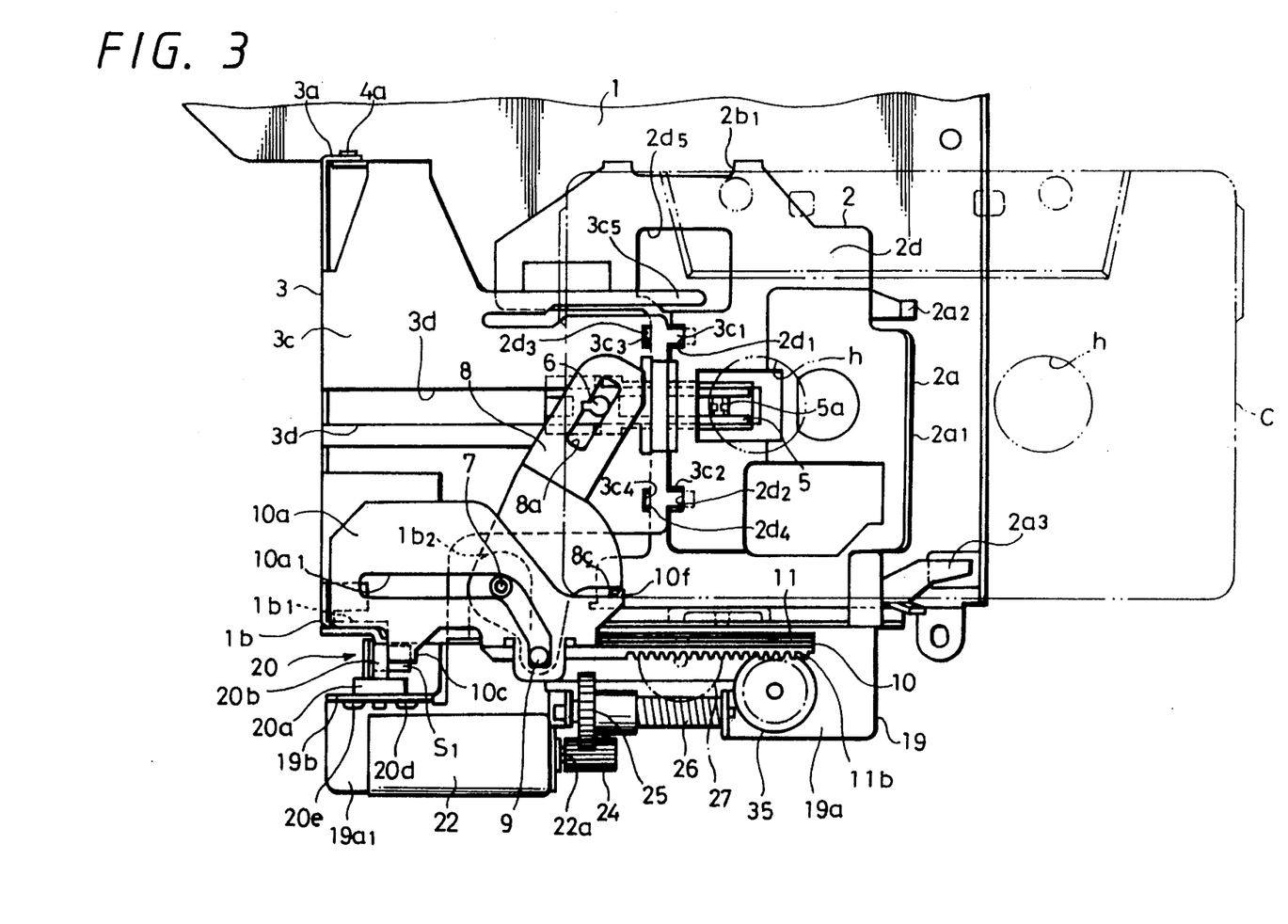
FIG. 3 is a fragmentary plan view showing the cassette loading apparatus according to the present invention.
Figure 4:
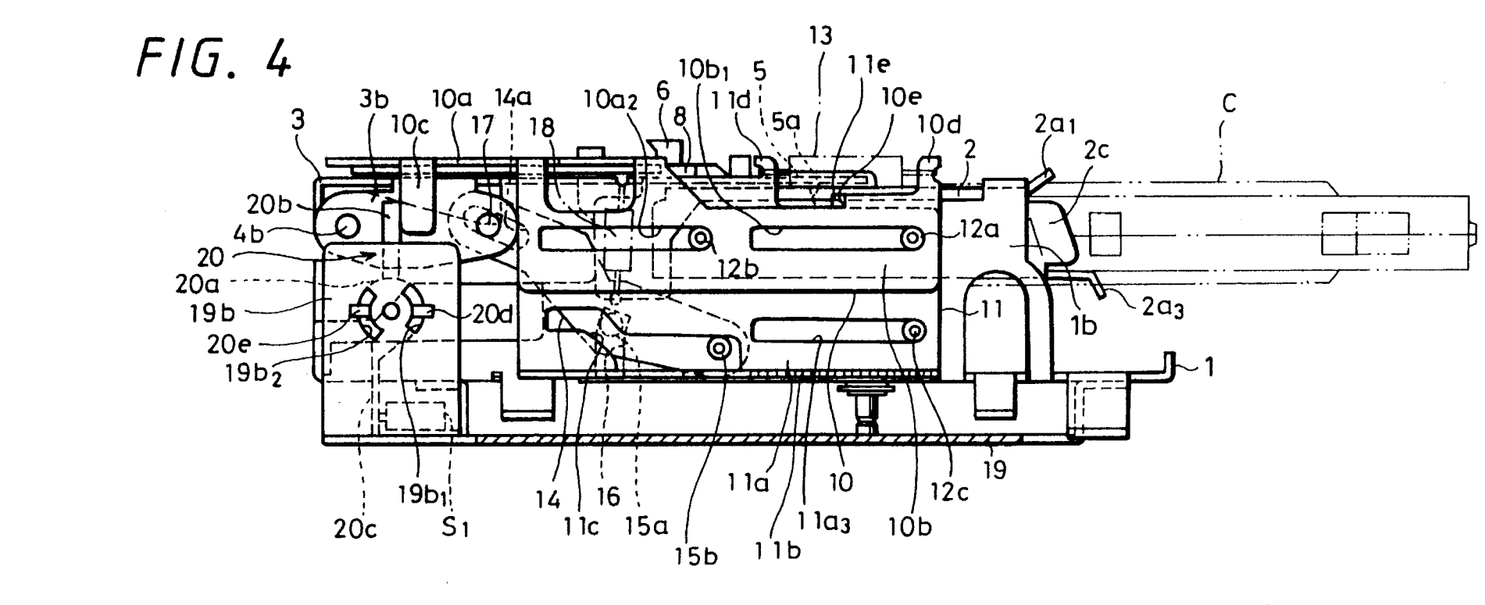
FIG. 4 is a side view showing the cassette loading apparatus according to the present invention.
Figure 5:
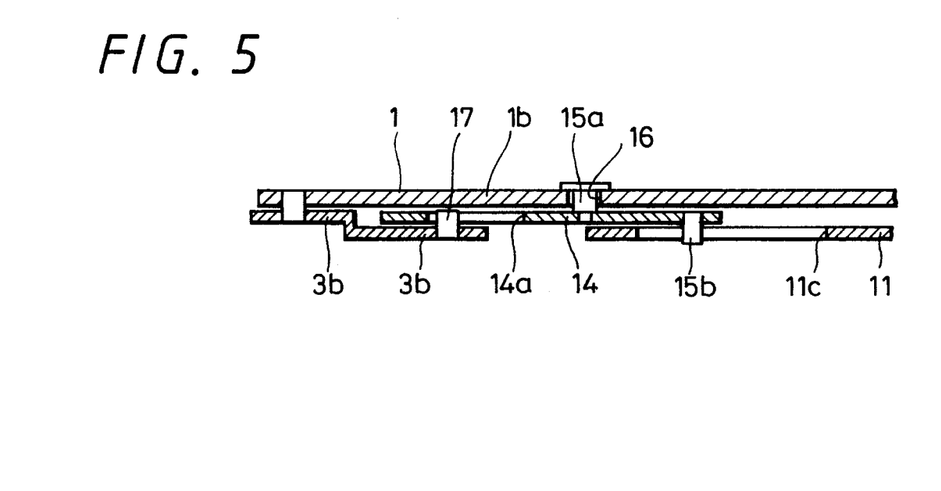
FIG. 5 is an enlarged cross-sectional view showing a part of the cassette loading apparatus according to the present invention.

Since the pull-in lever 8 and the first loading lever 10 are interconnected as described above, under the condition that the first loading lever 10 is slid in the rearward direction, the engagement pin 9 of the pull-in lever 8 is engaged with the front end of the curved portion of the cam opening 10a1 of the first loading lever 10 and thus the pull-in lever 8 is rotated in the forward direction and held in this state (see FIGS. 1 to 3). Under this condition, the catcher member 5 is placed at the front end portion of the guide rectangular opening 3d of the housing hanger 3, i.e., the catcher member 5 is placed at substantially the central portion of the cassette housing 2 through its engagement pin 6 engaged with the rectangular opening 8a defined on the tip end portion of the pull-in lever 8.

The pull-in lever 8 has an engagement edge 8c formed on its substantially central portion of the front edge. The first loading lever 10 has an engagement member 10f bent from the front end of its horizontal surface portion 10a. Therefore, when the engagement edge 8c is brought in contact with and engaged with the engagement member 10f, the pull-in lever 8 is prevented from rotating in the forward direction, thereby preventing the catcher member 5 from being moved uselessly.

The mechanical chassis 1 has a loading arm 14 attached to its side surface portion 1b. The loading arm 14 is disposed between the side surface portion 1b of the mechanical chassis 1 and the second loading lever 11. The loading arm 14 includes a first support shaft pin 15a projected from its intermediate portion toward the side surface portion 1b. A second support shaft pin 15b is projected from one end portion of the loading arm 14 toward the side surface portion 1b of the mechanical chassis 1. An opening 14a elongated in the longitudinal direction is defined on the other end portion of the loading arm 14.

The first support shaft pin 15a projected from the intermediate portion of the loading arm 14 is engaged with a bearing opening 16 of an arcuate configuration formed on the side wall portion 1b of the mechanical chassis 1 from its lower end edge to the upper direction. The second support shaft pin 15b of the loading arm 14 is engaged with the loading operation cam opening 11c of the second loading lever 11. The elongated opening 14a defined on the other end portion of the loading arm 14 is engaged with a supporting pin 17 implanted on the supporting portion 3b1 which is extended from the other bearing portion 3b of the housing hanger 3 to the forward direction. The loading arm 14 is biased in the clockwise direction in FIG. 4 under spring force of a tension coil spring 18 extended between it and the upper edge of the side surface portion 1b of the mechanical chassis 1 so that the first support shaft pin 15a of the loading arm 14 is engaged with the upper edge of the bearing opening 16. Thus, the loading arm 14 is rotated about the engagement portion of the first support shaft pin 15a and the upper edge of the bearing opening 16 in the clockwise direction thereby to bias the housing hanger 3 in the upper direction under spring force of the tension coil spring 18.

The mechanical chassis 1 has a base plate 19 attached to the rear surface of its bottom surface portion 1c. One side portion of the base plate 19 is protrusively extended from the side surface portion 1b of the mechanical chassis 2 to the outside to form an extended surface portion 19a. The extended surface portion 19a has a rear surface 19a1 from which a supporting surface portion 19b is vertically erected in an opposing and parallel fashion to the side surface portion 1b of the mechanical chassis 1. The supporting surface portion 19b has a switch operating lever 20 attached thereto to become rotatable in the front and back direction.

The switch operating lever 20 is composed of a circular bearing portion 20a, an operation member 20b and an operating member 20c. The circular bearing portion 20a is formed at the central portion of the switch operating lever 20. The operation member 20b is formed on the inner surface side of the circular bearing portion 20a and engaged with the rear portion of the engagement member 10c of the first loading lever 10. The operating member 20c is elongated from the switch operating lever 20 to operate a cassette-in switch S1. The operation member 20b is made thicker and heavier than the operating member 20c. The bearing portion 20a has a pair of engagement members 20d, 20e projected from its outer surface side. The pair of engagement members 20d, 20e are engaged with a pair of rotation restricting openings 19b1, 19b2 defined on the supporting surface portion 19b of the base plate 19.

When the first loading lever 10 is slid in the rearward direction, the operation member 20b of the switch operating lever 20 is pushed by the engagement member 10c and the switch operating lever 20 is rotated so that the cassette-in switch S1 is pressed and energized (ON) by the operating member 20c. When the first loading lever 10 is slid in the forward direction to disengage the engagement member 10c from the operation member 20b, the switch operating lever 20 is released from the locked state and made rotatable. Thus, the cassette-in switch S1 is released by the operating member 20c and de-energized (OFF). When the cassette-in switch S1 is de-energized (OFF), the operating member 20c of the switch operating lever 20 is pressed by a switch operating member (not shown) and rotated in the opposite direction. Since the upper operation member 20b is heavier than the lower operating member 20c, the switch operating lever 20 is rotated by a large rotational angle due to its light weight and the operating member 20c is disengaged from the cassette-in switch S1. This rotation of the switch operating lever 20 is restricted in a predetermined rotational range because the engagement members 20d, 20e implanted on the bearing portion 20a are engaged with the rotation restriction openings 19b1, 19b2 defined on the supporting surface 19b. Therefore, the switch operating lever 20 is prevented from rotating to a position wherein the heavy operation member 20b is located below the operating member 20c. As a consequence, the operating member 20c is held distant by a predetermined distance from the cassette-in switch S1 and the operating member 20c can be prevented from energizing the cassette-in switch S1 inadvertently.

Figure 6:
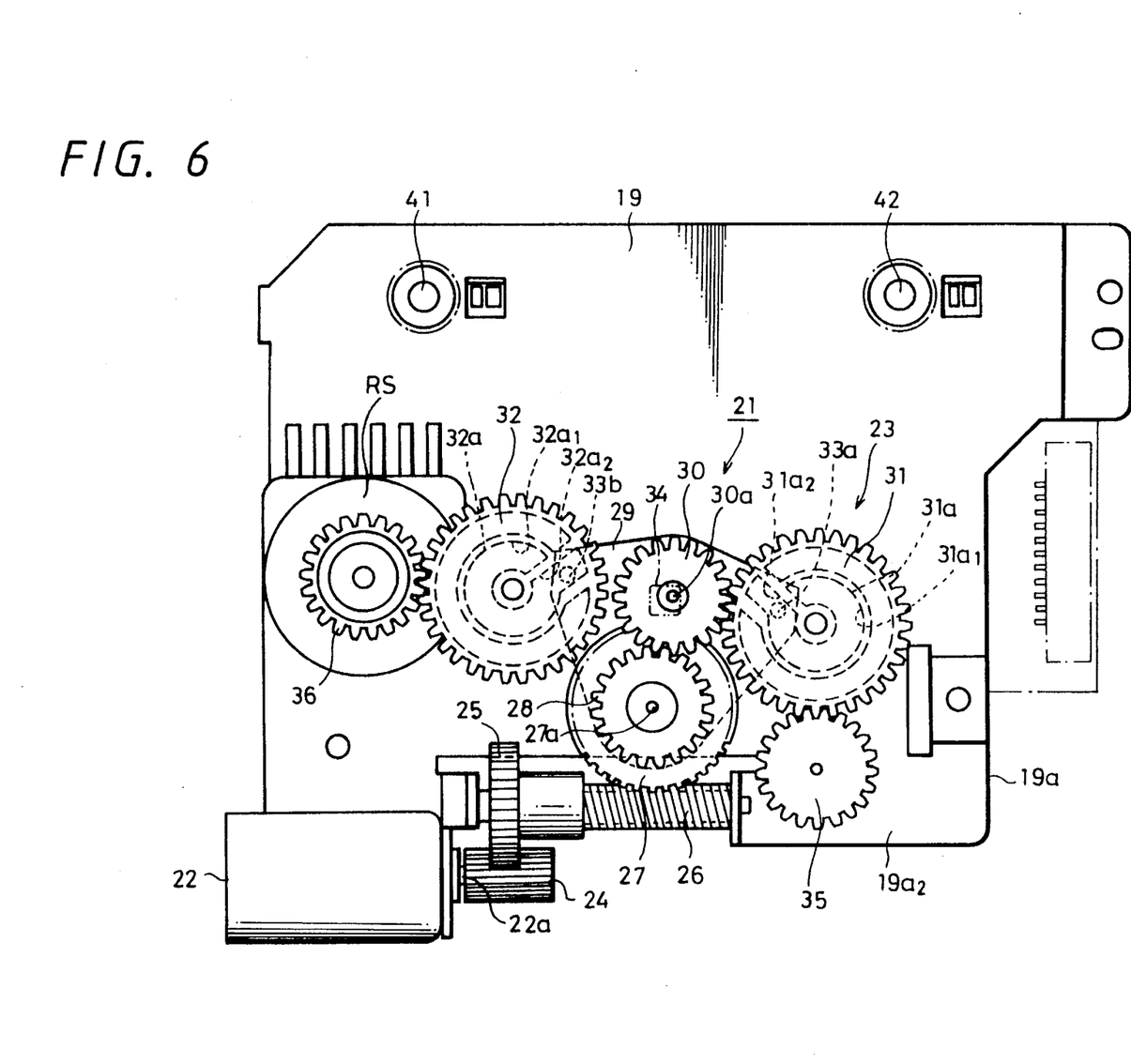
FIG. 6 is a plan view showing an example of a drive mechanism of the cassette loading apparatus according to the present invention.

The base plate 19 has a drive mechanism 21 mounted thereon as shown in FIG. 6.

As shown in FIG. 6, the drive mechanism 21 comprises a control DC motor 22 and a drive gear group 23. The control DC motor 22 is fixedly held on the rear surface 19a1 of the extended surface portion 19a of the base plate 19. The control DC motor 22 has a drive shaft 22a into which a motor gear 24 is fitted with a pressure. The drive gear group 23 is rotated by means of the motor gear 24. The drive gear group 23 is constructed as follows.

Specifically, the motor gear 24 is meshed with an intermediate gear 25 to which there is coaxially fixed a worm gear 26. The worm gear 26 is meshed with a worm wheel 27, and the worm wheel 27 is pivotally supported to the main body surface of the base plate 19 by a shaft 27a. The worm gear 27 has an interlocking gear 28 coaxially fixed thereto. A rotary plate 29 is rotatably supported to the shaft 27a of the worm wheel 27. The rotary plate 29 has a switch change-over gear 30 pivotally supported thereto and the switch change-over gear 30 is meshed with the interlocking gear 28.

A loading gear 31 and a switch gear 32 are pivotally supported on the main body surface of the base plate 19 across the change-over gear 30. The gears 31 and 32 have guide grooves 31a, 32a defined on the lower surfaces thereof, respectively. The guide groves 31a, 32a are composed of circular groove portions 31a1, 32a1 formed coaxially with the guide grooves 31a, 32a and engagement groove portions 31a2, 32a2 curved from one ends of the guide groove portions 31a1, 32a1 to the outer peripheral direction of the gears 31, 32. The guide grooves 31a, 32a of the two gears 31, 32 are engaged with engagement pins 33a, 33b projected on the rotary plate 29, respectively. A free end portion of the central shaft 30a of the switch change-over gear 30 is opposed to a window aperture 34 defined in the bottom surface porion 1c of the mechanical chassis 1.

Of the drive gear group 23, the loading gear 31 is meshed with a loading drive gear 35 that is pivotally supported to the front portion surface 19a2 of the elongated surface portion 19a of the base plate 19. The loading drive gear 35 is meshed with the rack 11b of the second loading lever 11.

The switch change-over gear 32 is meshed with a switch change-over gear 36. The switch change-over gear 36 is fixed to a shaft of a tape mode control rotary switch RS attached to the main body portion surface of the base plate 19.

In the thus arranged drive gear group 23, when the control DC motor 22 is energized to rotate, the worm wheel 27 is rotated through the worm gear 26 and the switch change-over gear 30 that is meshed with the interlocking gear 28 fixed to the worm wheel 27 is meshed with the loading gear 31 or the switch gear 32 in unison with the switching rotation of the rotary plate 29. In that case, by the switching rotation of the rotary plate 29, one of the engagement pins 33a, 33b projected on the rotary plate 29, e.g., the engagement pin 33a that is in engagement with the guide groove 31a of the loading gear 31 is moved from the engagement groove portion 31a2 of the guide groove 31a to the circular groove portion 31a1 when the rotary plate 29 is rotated in the direction in which the switch change-over gear 30 is meshed with the loading gear 31. The engagement pin 33b engaged with the guide groove 32a of the other switch gear 32 is moved from the circular groove portion 32a1 of the guide groove portion 32a to the engagement groove portion 32a2.

When the engagement pins 33a, 33b are moved in accordance with the rotation of the rotary plate 29 as described above, the engagement pin 33a is opposed to the circular groove portion 32a1 of the guide groove 31a to allow the loading gear 31 to become rotatable. Then, the loading gear 31 is meshed with the switch change-over gear 30 and rotated in unison with the switch change-over gear 30 to thereby rotate the loading drive gear 35 meshed with the loading gear 31.

When the engagement pin 32b is opposed to the engagement groove portion 32a2 of the guide groove 32a under the condition that the switch gear 32 is released from being meshed with the switch change-over gear 30, the switch gear 32 is hindered from rotating and the switch change-over gear 36 is kept inoperative.

When the switch change-over gear 30 is meshed with the switch gear 32, the opposite operation is carried out, whereby the loading gear 31 is hindered from rotating and the loading drive gear 35 is kept inoperative. On the contrary, the switch gear 32 is meshed with the switch change-over gear 30 and thereby rotated so that the switch change-over gear 36 meshed with the switch gear 32 is rotated.

Hub drive shafts 41, 42 of a supply reel and a take-up reel are mounted on the base plate 19. The two hub drive shafts 41, 42 are upwardly projected from the bottom surface portion 1c of the mechanical chassis 1, respectively. The cassette housing 2 is elevated and lowered relative to the two hub drive shafts 41, 42.

Capstans 43, 44 are implanted with a predetermined spacing on the mechanical chassis 1 at its bottom surface portion 1c from which the two hub drive shafts 41, 42 are projected. Pinch roller arms 47, 48 include pinch rollers 45, 46 facing the capstans 43, 44. The pinch roller arms 47, 48 are rotatably supported by shafts 47a, 48a to the bottom surface portion 1c. Further, guide posts 49, 50 are implanted on the bottom surface portion 1c of the mechanical chassis 1 at the positions near the capstans 43, 44.

The pinch roller arms 47, 48 include engagement pins 47b, 48b implanted on the free end portions thereof. The engagement pins 47b, 48b are engaged with a slide frame 51 with a predetermined play. The slide frame 51 is attached to the bottom surface portion 1c of the mechanical chassis 1 to encircle the two hub drive shafts 41, 42, the capstans 43, 44 and the guide posts 49, 50 such that it becomes freely slidable in the lateral direction. Thus, the pinch roller arms 47, 48 are constantly biased in the direction of the capstans 43, 44 under spring force of a spring member 52.

A head base plate having a head mounted thereon is joined to the slide frame 51 and is slid with respect to the mechanical chassis 1 in unison with the slide frame 51, though not shown.

As shown in FIG. 1, a drive motor 53 is fixed to the bottom surface portion 1c of the mechanical chassis 1 to rotate the hub drive shafts 41, 42 and the capstans 43, 44.

Operation of the tape cassette loading apparatus thus arranged will be described below.

Initially, in the eject state, as shown in FIGS. 1 through 4, since the loading arm 14 is biased in the upper direction under spring force of the tension coil spring 18, the housing hanger 3 is supported about the shaft pins 4a, 4b substantially horizontally with respect to the mechanical chassis 1 at the rear bearing portions 3a, 3b. Thus, the cassette housing 2 is substantially horizontally suspended to the cassette hanger 3 above the hub drive shafts 41, 42 by the engagements among the engagement protrusions 2d1, 2d2 and 3c1, 3c2 in a cantilever fashion.

In this state, the second loading lever 11 is moved in the rearward and the rack 11b of the second loading lever 11 is meshed with and engaged with the loading drive gear 35 which is in the stopped condition. As a result, the first loading lever 10 is moved in the rearward under spring force of the tension coil spring 13 and the engagement stepped portion 10e is engaged with the engagement protrusion 11e. Therefore, under the condition that the pull-in lever 8 is rotated in the forward direction, the engagement pin 9 is engaged with the curved end portion of the cam opening 10a1 of the first loading lever 10, whereby the pull-in lever 8 is engaged with the first loading lever 10. Thus, the catcher 5 is moved to and held at the tip end portion of the guide rectangular opening 3c1 of the housing hanger 3.

In this eject state, when the tape cassette C is inserted into the cassette housing 2 from the insertion opening 2a of the front surface side at its lateral position, the front hub aperture h is engaged with the engagement protrusion 5a of the catcher member 5. Thus, when the tape cassette C is pressed in this state, the catcher member 5 also is moved along the guide rectangular opening 3c1 of the housing hanger 3 in the rearward direction in unison with the movement of the tape cassette C.

When the catcher member 5 is slid in the rearward, the pull-in lever 8 is rotated about the shaft pin 7 in the rearward direction and the other end of the pull-in lever 8 is displaced in the forward direction with the result that the engagement pin 9 implanted on the other end of the pull-in lever 8 presses the first loading lever 10 at the curved end portion of the cam opening 10a1 in the forward direction.

The first loading lever 10 is slid in the forward by the pressing operation of the engagement pin 9 against the spring-biasing force of the tension coil spring 13 extended between it and the second loading lever 11 to thereby disengage the rear engagement member 10c from the operation member 20b of the switch operating lever 20 of the cassette-in switch S1. Thus, the switch operation lever 20 is rotated by the dead weight of the operation member 20b as described before to release the cassette-in switch S1 from the depression of the operating member 20c, thereby the cassette-in switch S1 being de-energized (OFF).

When the cassette-in switch S1 is de-energized (OFF), a microcomputer (not shown) included in the drive mechanism 21 is energized and the control DC motor 22 starts being rotated. When the control DC motor 22 is rotated, the loading gear 31 in the drive gear group 23 is rotated through the worm gear 26, the worm wheel 27, the interlocking gear 28 and the switch change-over gear 30, in that order. Rotation of the loading gear 31 is transmitted to the loading drive gear 35 and the second loading lever 11, which is meshed with the drive gear 35 at the rack 11b, is slid in the forward direction.

When the second loading lever 11 is slid in the forward direction, the first loading lever 10 also is slid in the forward direction by the engagement between the engagement stepped portion 10e and the engagement protrusion member 11e in unison with the sliding operation of the second loading lever 11.

Figure 7:
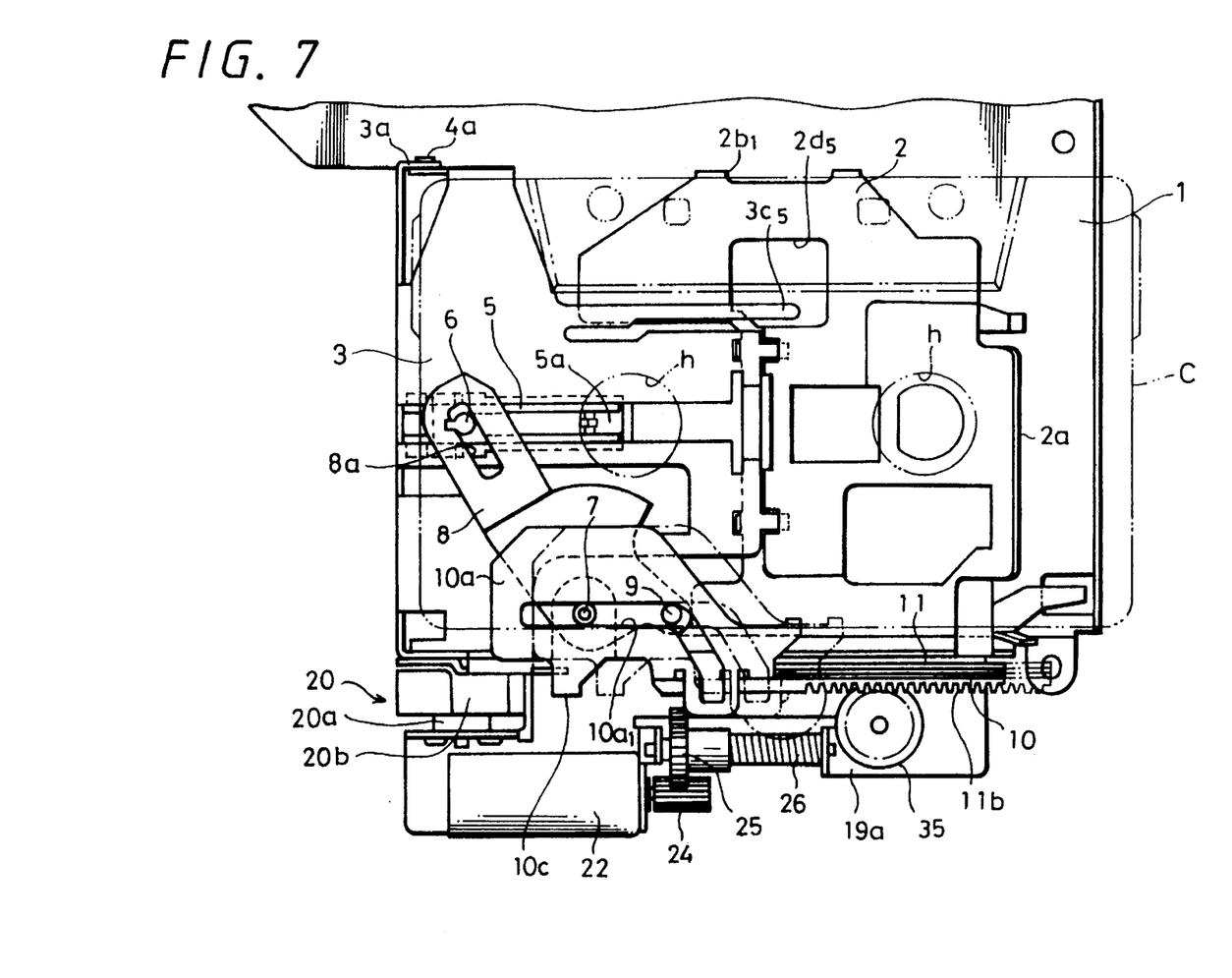
FIG. 7 is a fragmentary plan view showing the cassette loading apparatus in operation.

When the first and second loading levers 10, 11 are each moved by an initial predetermined length (e.g., 12 mm) as described above, the cam opening 10a1 of the first loading lever 10 is opposed to the engagement pin 9 of the pull-in lever 8 from the curved portion to the straight line portion so that the pull-in lever 8 is rotated about the shaft pin 7 by a large rotation angle in the rearward direction. Thus, the catcher member 5 that is joined to the pull-in lever 8 is slid rearwardly by a large distance along the guide rectangular opening 3c1 of the housing hanger 3. Therefore, when the catcher 5 is slid in the rearward direction, the tape cassette C that is engaged with the catcher member 5 is pulled into the cassette housing 2 in unison with the sliding operation of the catcher member 5.

When the first and second loading levers 10 and 11 are moved initially, the loading operation cam opening 11c of the second loading lever 11 is opposed at its horizontal portion to the second support shaft pin 15b of the loading arm 14 so that the loading arm 14 is not rotated. As a result, the housing hanger 3 is held in the horizontal state.

Figure 8:
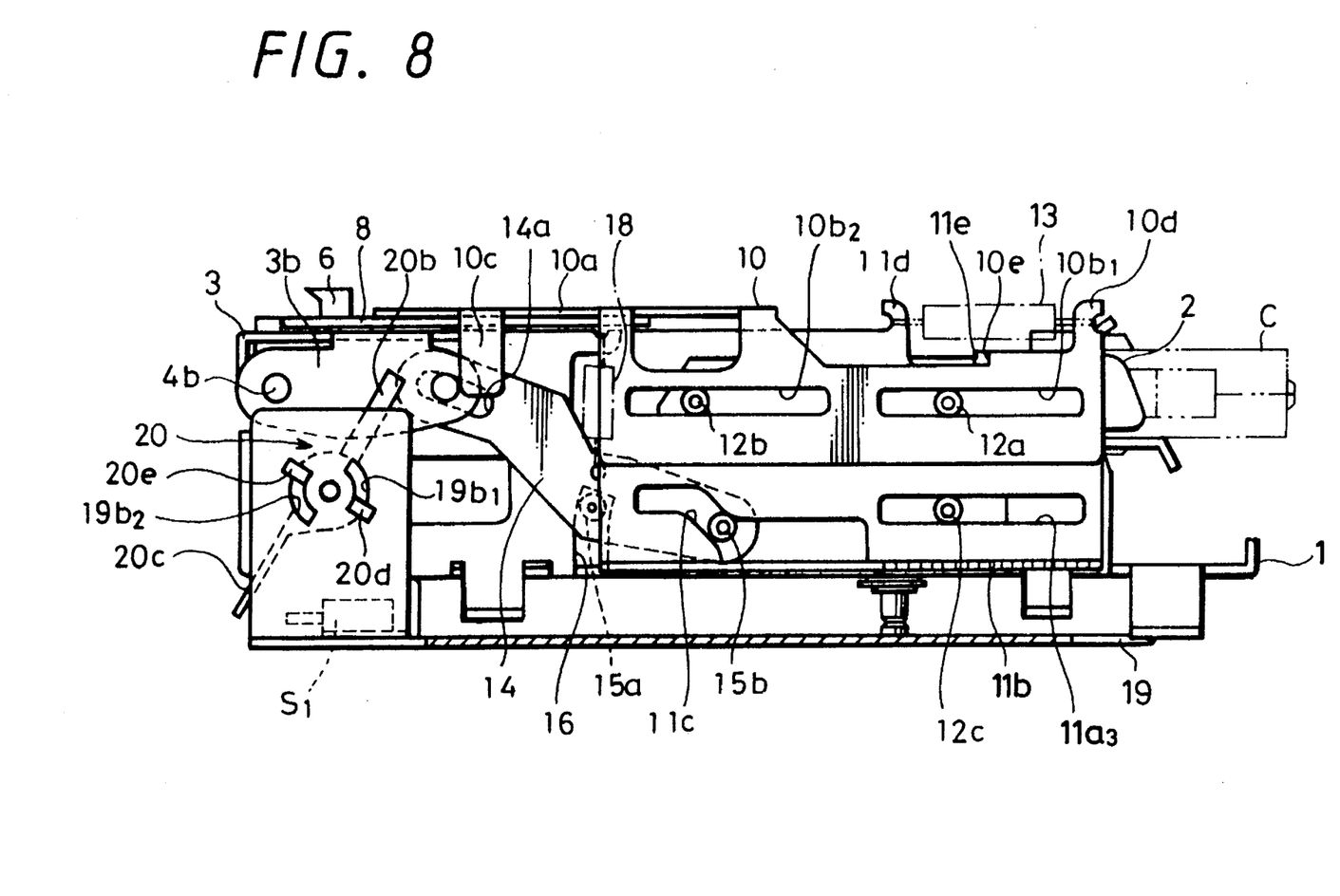
FIG. 8 is a side view of the cassette loading apparatus in an intermediate state of operation.

Further, when the loading drive gear 35 is rotated to move the first and second loading levers 10, 11 forwardly, the inclined cam portion of the loading operation cam opening 11c of the second loading lever 11 abuts against the second support shaft pin 15b and elevates the second support shaft pin 15b, whereby the loading arm 14 is rotated about the engagement portion between the first support shaft pin 15a and the bearing elongated opening 16 of the mechanical chassis 1 such that the rear half portion thereof is lowered.

When the loading arm 14 is rotated as described above, the housing hanger 3 is downwardly rotated about the bearing portion formed by the rear shaft pins 4a, 4b relative to the mechanical chassis 1, whereby the cassette housing 2 is lowered horizontally under the condition that it is bent from the engagement and coupling portion between it and the housing hanger 3 in the horizontal direction. In this operation, the cam opening 10a1 of the first loading lever 10 is opposed at its front and rear straight line portion to the engagement pin 9 of the pull-in lever 8. Thus, the pull-in lever 8 is held in the state that it is rotated in the rearward, thereby maintaining the pulled-in state of the tape cassette C in the cassette housing 2. In other words, the catcher member 5 is held at the cassette pull-in position relative to the housing hanger 3.

Figure 9:
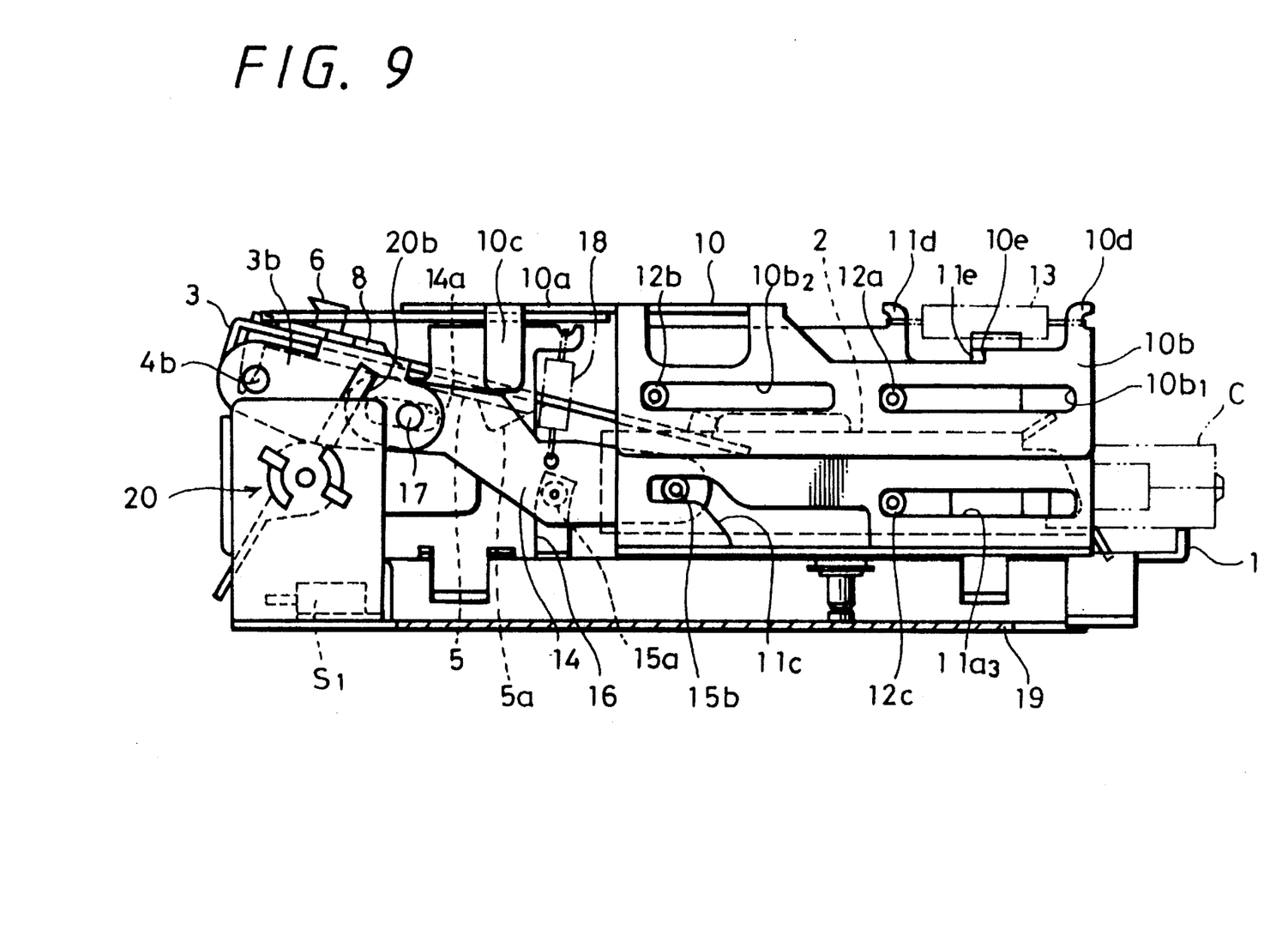
FIG. 9 is a side view of the cassette loading apparatus in an operationally complete state.

When the cassette housing 2 is lowered up to the lowest position as described above, the tape cassette C also is disengaged from the catcher member 5 and lowered in unison with the cassette housing 2, whereby the hub drive shafts 41, 42 are fitted into the two hub apertures h and the capstans 43, 44 and the guide posts 49, 50 are inserted into the capstan apertures and the reference apertures, respectively. Thus, the loading operation of the tape cassette C is completed.

Even under the condition that the loading operation of the tape cassette C is finished, the cassette housing 2 is held at the lowest position by the housing hanger 3 in the inclined state. Also, the pull-in lever 8 is rotated in the rearward direction and holds the catcher member 5 at the pull-in position of the tape cassette C.

At the completion of the loading operation of the tape cassette C, a slide frame 52 is slid and the pinch rollers 45, 46 are entered into the tape cassette C to urge the tape (not shown) against the capstans 43, 44. Moreover, the magnetic head (not shown) is inserted into the tape cassette C from the front window and thereby urged against the tape to record or reproduce the tape.

Eject operation for ejecting the tape cassette C from the tape cassette player after the tape cassette C was loaded into the tape cassette player at its predetermined position and the tape was recorded and/or reproduced can be realized by driving the control DC motor 22 in the reverse direction to operate the respective members in an opposite fashion and therefore need not be described herein.

Figure 10:
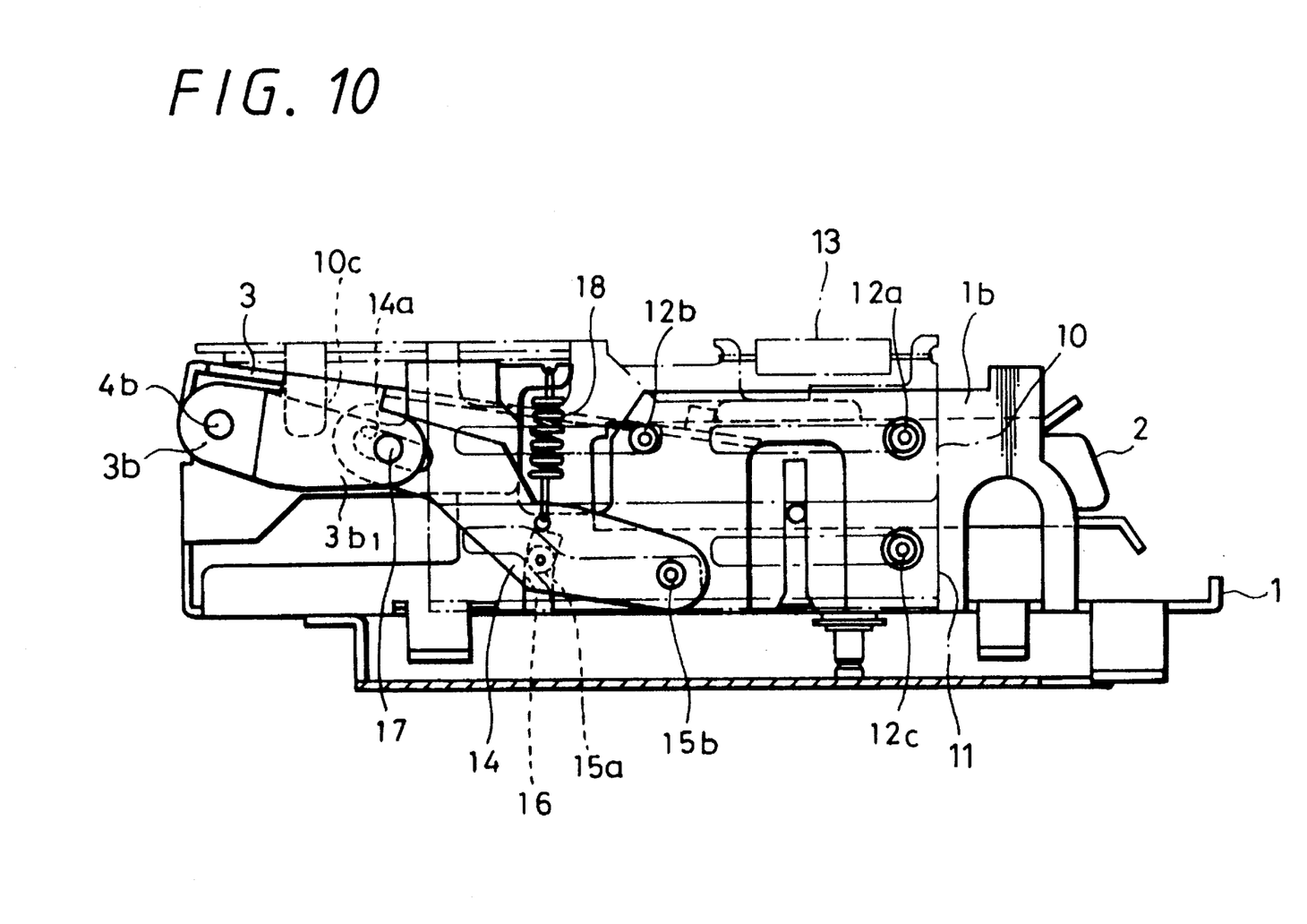
FIG. 10 is a side view of the cassette loading apparatus during operation wherein a pressing force is unintentionally applied to the cassette loading apparatus.

With the above-mentioned arrangement, if the cassette housing 2 and the housing hanger 3 which are elevated and lowered under the condition that the tape cassette C is inserted into and held therein are unintentionally pressed by an external force from above when assembled or in use, e.g., if the external force is applied to the cassette housing 2, for example, then the cassette housing 2 is lowered to rotate the housing hanger 3 in the lower direction through the engagement portion between it and the housing hanger 3. If an external force is directly applied to the housing hanger 3, then the housing hanger 3 is rotated in the lower direction while lowering the cassette housing 2. Thus, the loading arm 14 is applied with an external force through the supporting pin 17 implanted on the supporting portion 3b1 from the housing hanger 3, whereby the second support shaft pin 15b formed at one end portion of the loading arm 14 is engaged with the upper edge of the loading operation cam opening 11c of the second loading lever 11. As a result, the loading arm 14 is rotated about this engagement portion in the lower direction against the spring-biasing force of the tension coil spring 18.

In that case, the first support shaft pin 15a formed at the intermediate portion of the loading arm 14 is moved in the lower direction along the elongated aperture 16 defined on the side surface portion 1b of the mechanical chassis 1 so that the loading arm 14 is rotated in the lower direction under spring force of the tension coil spring 18.

When the loading arm 14 is rotated in the lower direction, the housing hanger 3 becomes rotatable in the lower direction. Thus, when the cassette housing 2 and the housing hanger 3 are applied with an external force, the tension coil spring 18 acts as a limiter mechanism through the loading arm 14 so that the cassette housing 2 and the housing hanger 3 are rotated under spring force of the tension coil spring 18. Therefore, the cassette housing 2 and the housing hanger 3 can be prevented from being deformed and the bearing portions thereof can be prevented from being broken. Thus, it is possible to keep the loading apparatus in the safety state.

The above-mentioned respective members can take various modifications and variations so long as they can be operated similarly as described above.

As set forth, according to the present invention, the automatic loading mechanism can be constructed by the simple arrangement. Also, in association with the tape driving mechanism, control operation can be simplified and microcomputer program also can be simplified.

Further, since the safety mechanism used to protect the cassette housing and the cassette hanger from an external force can be constructed with ease without increasing the number of the parts, it is possible to provide an inexpensive automatic loading apparatus in which the cassette housing and the cassette hanger can be protected from an external force.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A loading mechanism for a tape cassette player comprising:
    a cassette housing supported on a mechanical chassis so as to be elevated and lowered between a cassette loading position and a cassette playing position, respectively;
    a housing hanger pivotally supported on the mechanical chassis and operatively connected with said cassette housing in a manner effective to cause said cassette housing to be elevated and lowered;
    a loading lever arrangement operatively connected with a control motor in a manner to be driven to move by the control motor; and
    a loading arm interconnecting said housing hanger and said loading lever arrangement for converting movement of said loading lever arrangement to rotation of said housing hanger, said loading arm including:
        a first support shaft movably engaged with a vertically-elongated opening defined in the mechanical chassis,
        a second support shaft engaged with an operation cam opening defined in said loading lever arrangement, and
        a first spring connected between the mechanical chassis and said loading arm for biasing said loading arm in a direction wherein said first support shaft is biased into engagement with an upper end of said elongated opening defined in the mechanical chassis;
    said loading arm being resiliently supported by said first spring in a manner wherein said first support shaft is pivotable about said second support shaft against said spring in a manner wherein, when a downward external force is applied to said cassette housing, damage to said housing hanger and said cassette housing is prevented.

2. A loading mechanism according to claim 1, wherein said second support shaft is pivoted about said first support shaft by said operation cam opening when said loading lever arrangement is driven to move by the control motor.

3. A loading mechanism according to claim 1, wherein said loading lever arrangement comprises a first loading lever and a second loading lever, said second loading lever being engaged with said loading arm and operatively connected with said control motor, and a second spring member which is extended between said first and second loading levers and which provides a resilient connection between said first loading lever and said second loading lever.

4. A loading mechanism according to claim 1, wherein said first support shaft acts as the fulcrum about which said loading lever is pivotal.

* * * * *